(12) United States Patent
Springer et al.

(10) Patent No.: US 8,768,069 B2
(45) Date of Patent: Jul. 1, 2014

(54) IMAGE ENHANCEMENT APPARATUS AND METHOD

(75) Inventors: Paul Springer, Stuttgart (DE); Toru Nishi, Kawasaki (JP); Martin Richter, Dortmund (DE); Matthias Brueggemann, Bueren (DE)

(73) Assignee: Sony Corporation, Tokyo (JP)

( * ) Notice: Subject to any disclaimer, the term of this patent is extended or adjusted under 35 U.S.C. 154(b) by 35 days.

(21) Appl. No.: 13/399,405

(22) Filed: Feb. 17, 2012

(65) Prior Publication Data

US 2012/0219229 A1 Aug. 30, 2012

(30) Foreign Application Priority Data

Feb. 24, 2011 (EP) .................................... 11155849

(51) Int. Cl.
*G06K 9/48* (2006.01)

(52) U.S. Cl.
USPC ........... 382/199; 382/236; 382/233; 382/232; 382/243; 382/248; 382/250; 382/190; 382/209; 382/239; 382/216; 382/217; 382/224

(58) Field of Classification Search
CPC ........ G06K 9/40; G06T 5/003; G06T 7/0042; G06T 2207/30168; G06T 5/001; G06T 5/002; G06T 7/2073; H04N 19/00757; H04N 1/58
USPC ......... 382/199, 236, 233, 232, 243, 248, 250, 382/190, 209, 239, 216, 217, 224
See application file for complete search history.

(56) References Cited

U.S. PATENT DOCUMENTS

| | | | |
|---|---|---|---|
| 6,323,905 B1 * | 11/2001 | Kondo et al. | 348/441 |
| 6,804,417 B1 | 10/2004 | Lund et al. | |
| 7,085,323 B2 | 8/2006 | Hong | |
| 7,379,612 B2 | 5/2008 | Milanfar et al. | |
| 2009/0245375 A1 | 10/2009 | Liu | |
| 2010/0054338 A1 * | 3/2010 | Suzuki et al. | 375/240.16 |
| 2010/0119176 A1 | 5/2010 | Ichihashi et al. | |

FOREIGN PATENT DOCUMENTS

JP 2009-124621 6/2009

OTHER PUBLICATIONS

U.S. Appl. No. 13/886,807, filed May 3, 2013, Springer, et al.
U.S. Appl. No. 13/887,021, filed May 3, 2013, Springer, et al.
H. Schröder, et al., "Nonlinear Picture Enhancement Techniques for Vertically Interpolated TV-Signals", Signal Processing III: Theories and Application, EURASIP, 1986, pp. 841-844.

(Continued)

*Primary Examiner* — Mike Rahmjoo
(74) *Attorney, Agent, or Firm* — Oblon, Spivak, McClelland, Maier & Neustadt, L.L.P.

(57) ABSTRACT

The present invention relates to an image enhancement apparatus for enhancing an input image of a sequence of input images. To provide the ability to increase the resolution of an input image and/or to temporally reduce artifacts and/or noise in an input image, the apparatus comprises a motion compensation unit, a weighted selection unit, a feature analysis unit, an image model unit configured to generate a modelled image by applying an image model on said input image and/or said weighted selection image, a spatio-temporal detail signal generation unit configured to generate a detail signal from said input image and said weighted selection image, and a combination unit configured to generate said enhanced output image from said input image, said detail signal and said modelled image.

23 Claims, 16 Drawing Sheets

(56) References Cited

OTHER PUBLICATIONS

Gerard De Haan, et al. "True-Motion Estimation with 3-D Recursive Search Block Matching", IEEE Transactions on Circuits and Systems for Video Technology, vol. 3, No. 5, Oct. 1993, pp. 368-379.

Giovani Gomez, "Local Smoothness in Terms of Variance: The Adaptive Gaussian Filter", Proc. of the 11th British machine vision convergence, vol. 2, pp. 815-824, 2000.

Sean Borman, et al., "Simultaneous Multi-frame MAP Super-Resolution Video Enhancement using Spatio-temporal Priors", IEEE Int. Conference on Image Processing, 1999, 5 pages.

S. C. Park, et al., "Super-Resolution Image Reconstruction: A Technical Overview", IEEE Signal Processing Magazine, vol. 20, No. 3, May 2003, pp. 21-36.

Sina Farsiu, et al., "Video-to-Video Dynamic Super-Resolution for Grayscale and Color Sequences", EURASIP Journal of Applied Signal Processing, Special Issue on Superresolution Imaging, vol. 2006, 2006, pp. 1-15.

Yaozu An, et al., "Neighborhood-based Weighted Regularization of Video Sequence Super-resolution", IEEE Computer Society, International Conference on Computational Intelligence and Security, 2009, pp. 146-150.

* cited by examiner

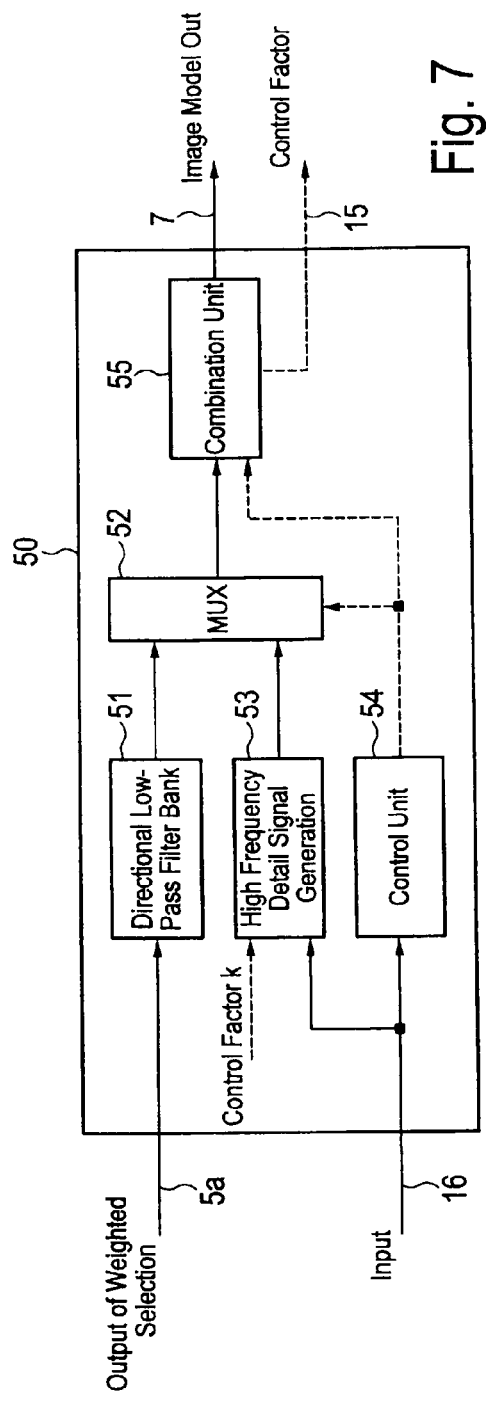
Fig. 7
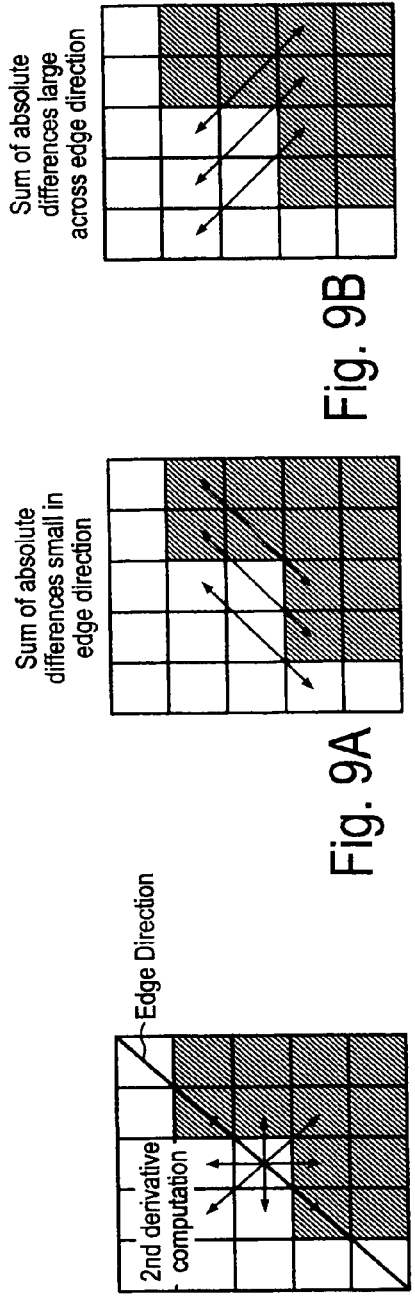
Fig. 8
Fig. 9A
Fig. 9B

IMAGE ENHANCEMENT APPARATUS AND METHOD

CROSS-REFERENCE TO RELATED APPLICATIONS

The present application claims priority of European patent application 11155849.0 filed on Feb. 24, 2011.

FIELD OF THE INVENTION

The present invention relates to an image enhancement apparatus and a corresponding method for enhancing an input image of a sequence of input images and obtaining an enhanced output image. Further, the present invention relates to a display device, a computer program and a computer readable non-transitory medium.

BACKGROUND OF THE INVENTION

Super-resolution can enhance the resolution in images and video sequences. The specific characteristic of super-resolution is that it is able to create high resolution frames which have high spatial frequencies not present in each low resolution input frame.

There are several possible strategies to increase the (overall) resolution per image: (a) adding of synthetic detail signals, e.g. to sharpen edges (LTI, see e.g. H. Schröder, H. Elsler, and M. Fritsch, "Nonlinear Picture Enhancement Techniques for Vertically Interpolated TV-Signals", EUSIPCO Conf. Proceedings, pp. 841-844, 1986) (b) on-line or off-line optimization utilizing image models as e.g. described in U.S. Pat. No. 6,323,905 to create edges with higher steepness and less staircase artifacts and (c) reconstruction of high frequency information by using alias and sub-pixel motion between consecutive frames as e.g. described in S. Borman and R. Stevenson, "Simultaneous Multi-frame MAP Super-Resolution Video Enhancement using Spatio-temporal Priors, IEEE Int. Conference on Image Processing, 1999. All these procedures incorporate the generation of most likely information based on previously made assumptions.

A challenging task is to check the validity of these assumptions and qualify the given input video and to separate false information caused by artifacts from novel image content. Especially when multiple input frames are utilized, robust motion estimation to align the consecutive frames to one (anchor) frame is required. Mainly all known methods (e.g. as described in S. Farsiu, M. Elad, and P. Milanfar, "Video-to-Video Dynamic Superresolution for Grayscale and Color Sequences", EURASIP Journal of Applied Signal Processing, Special Issue on Superresolution Imaging, Vol. 2006) rely on robust global motion models, but if this estimation fails or the input sequence has e.g. motion of several objects, severe artifacts will be present in the output video.

A known method for image enhancement is back-projection super-resolution as e.g. described in S. C. Park, M. K. Park, and M. G. Kang, "Super-Resolution Image Reconstruction: A Technical Overview", IEEE Signal Processing Magazine, Vol. 20, No. 3, May 2003, pp. 21-36. Back-projection super-resolution obtains high frequency information via an iterative process. In this algorithm the degradation process between high resolution and low resolution sequence is modelled by motion compensation, blurring, and down-sampling. Then, in an iteration loop the current (received) low resolution images are compared to (modelled) low resolution frames obtained by applying the degradation process to the actual high resolution image. The difference between modelled and received images is utilized to update the current high resolution image. This is done until convergence. The first guess for the high resolution image can be computed by e.g. standard interpolation techniques.

Another known method for image enhancement is maximum-a-posteriori super resolution as e.g. described in S. Borman and R. Stevenson, "Simultaneous Multi-frame MAP Super-Resolution Video Enhancement using Spatio-temporal Priors, IEEE Int. Conference on Image Processing, 1999. Maximum-a-posteriori (MAP) super-resolution has an additional image model but otherwise a strong similarity to back-projection. Thus, the disadvantages are also the same, a required large number of input frames and a high computational load due to a large number of iterations per frame.

Still another known method for image enhancement is Kalman filter based super-resolution as e.g. described in S. Farsiu, M. Elad, and P. Milanfar, "Video-to-Video Dynamic Superresolution for Grayscale and Color Sequences", EURASIP Journal of Applied Signal Processing, Special Issue on Superresolution Imaging, Vol. 2006. Kalman filter based super-resolution utilizes Kalman theory to compute the super-resolution frames. This algorithm also uses a temporal feed-back loop.

Another known method is described in US 2009/0245375 A1. This method has an integrated artifact reduction in the super-resolution process. For computing the current high resolution output frame, the following input signals (frames) must be available: current and next low resolution input frames, previous detail signal added to the input to obtain the previous high resolution frame and an initial high resolution frame. Then, four separate main processing blocks are utilized to obtain the output signals for the next frame: 1. Artifact suppression in the output high resolution frame by masking the current detail signal based on motion vectors and the previous detail signal. 2. Computing the next initial high resolution frame by a weighting between current motion compensated high resolution frame and next low resolution frame. 3. Detail signal generation for the current frame based on filtering, weighting of initial current high resolution frame and current low resolution frame. 4. Adding the weighted current detail signal to the current initial high resolution frame to obtain the current high resolution output frame.

BRIEF SUMMARY OF THE INVENTION

It is an object of the present invention to provide an image enhancement apparatus and a corresponding image enhancement method for enhancing an input image of a sequence of input images and obtaining an enhanced output image, which particularly provide the ability to increase the resolution of an input image and/or to temporally reduce artefacts and/or noise in an input image. The provided apparatus and method shall particularly be computationally efficient, require only a small storage resulting in cheap hardware costs and a high image or video output quality robust towards motion estimation errors and other side-effects. It is a further object of the present invention to provide a corresponding computer program for implementing said method and a computer readable non-transitory medium.

According to an aspect of the present invention there is provided an image enhancement apparatus for enhancing an input image of a sequence of input images and obtaining an enhanced output image, said apparatus comprising:

a motion compensation unit configured to generate at least one preceding motion compensated image by compensating motion in a preceding output image, a weighted selection unit configured to generate a weighted selection image from said input image and said preceding motion compensated image, both being weighted by a respective selection weighting factor, a feature analysis unit configured to analyse at least the input image and to generate feature information by segmenting the input image into two or more input image regions having different features, an image model unit configured to generate a modelled image by applying an image model, in particular a Huber Markov image model, on said input image and/or said weighted selection image, a spatio-temporal detail signal generation unit configured to generate a detail signal from said input image and said weighted selection image, and a combination unit configured to generate said enhanced output image from said input image, said detail signal and said modelled image.

According to a further aspect of the present invention there is provided an image enhancement apparatus for enhancing an input image of a sequence of input images and obtaining an enhanced output image, said apparatus comprising:

a motion compensation means for generating at least one preceding motion compensated image by compensating motion in a preceding output image, a weighted selection means for generating a weighted selection image from said input image and said preceding motion compensated image, both being weighted by a respective selection weighting factor, a feature analysis means for analysing at least the input image and generating feature information by segmenting the input image into two or more input image regions having different features, an image model means for generating a modelled image by applying an image model, in particular a Huber Markov image model, on said input image and/or said weighted selection image, a spatio-temporal detail signal generation means for generating a detail signal from said input image and said weighted selection image, and a combination means for generating said enhanced output image from said input image, said detail signal and said modelled image.

According to still further aspects a corresponding image enhancement method, a computer program comprising program means for causing a computer to carry out the steps of the method according to the present invention, when said computer program is carried out on a computer, as well as a computer readable non-transitory medium having instructions stored thereon which, when carried out on a computer, cause the computer to perform the steps of the method according to the present invention are provided.

Preferred embodiments of the invention are defined in the dependent claims. It shall be understood that the claimed image enhancement method, the claimed computer program and the claimed computer readable medium have similar and/or identical preferred embodiments as the claimed image enhancement apparatus and as defined in the dependent claims.

The present invention provides an apparatus and a method to enhance an input video by increasing the (perceived) resolution and reducing artifacts in a very computational and memory efficient way. This is achieved by the increase of resolution impression by merging information of multiple input frames and/or image models. Due to several combined image processing steps controlled by a feature analysis and a recursive (temporal) feed-back loop, the level of enhancement can be controlled very well and side-effects caused e.g. by wrong motion estimation can be prevented or at least strongly reduced. Moreover, the present invention is designed to handle realistic video with local and global motion and preventing over-enhancement in case of already high-end input. Control features make it capable to handle input video of any kind.

The provided apparatus and method are computationally efficient, require a low number of frame memories resulting in cheap hardware costs and a high image or video output quality robust towards motion estimation errors and other side-effects. The known methods described above are different and do not provide these advantages. In particular, adding of synthetic details requires a large data bank, and, moreover, the detail signal is not obtained from the input video itself hence it is not perfectly matching the input content. Methods needing multiple input frames or intermediate signals are not very hardware efficient. A further disadvantage is that many known methods require very accurate motion vectors and a very smooth vector field (provided by global motion estimation). Local motion of objects (e.g. computed by block-based motion estimation as proposed in a preferred embodiment of the present invention) cannot be handled by many of the known methods described above.

A disadvantage of the known back-projection is that no image model (purely spatial processing) is present in the algorithm to further improve the current output. Additionally, the iteration process is very time-consuming and multiple input frames (yielding high number of frame memories) are required to achieve a good output sequence. Kalman filter super-resolution can only handle global motion vectors. Otherwise severe blur will be present in the output sequence. No local object motion can be handled very well due to the internal model of this method. Furthermore the described known methods use an internal up- and downscaling to check the convergence of the method, resulting in a high effort.

The present invention is preferably used in a display device, such as a monitor, a video display or a TV. Such a display device comprises an image enhancement apparatus as proposed according to the present invention for enhancing an input image of a sequence of input images and obtaining an enhanced output image and a display for displaying said output image.

BRIEF DESCRIPTION OF THE DRAWINGS

These and other aspects of the present invention will be apparent from and explained in more detail below with reference to the embodiments described hereinafter. In the following drawings FIG. 7 shows an embodiment of an image model unit, FIG. 8 illustrates a computation scheme used in the image model unit, FIG. 9 illustrates another computation scheme used in the image model unit.

DETAILED DESCRIPTION OF THE INVENTION

Figure 1:
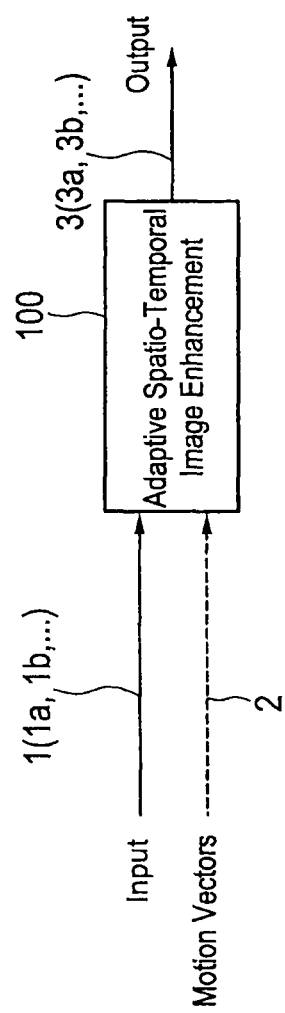
FIG. 1 shows a general layout of an image enhancement apparatus according to the present invention.

FIG. 1 schematically depicts a general layout of the image enhancement apparatus 100 according to the present invention. An adaptive spatio-temporal image enhancement is carried out on an input image sequence 1 of input images 1a, 1b, . . . , preferably using motion vector information 2 that is e.g. obtained from a preceding motion estimation to obtain an output image sequence 3 of enhanced output images 3a, 3b, . . . , the index a, b, . . . indication the time sequence of the respective images. Said output images 3a, 3b, . . . can be enhanced in a way to have a higher resolution, higher SNR, fewer artefacts and/or less noise compared to the respective input images 1a, 1b, . . . . The motion vector information preferably includes motion vectors describing the motion for each pixel in x-(horizontal) and y-(vertical) direction.

Figure 2:
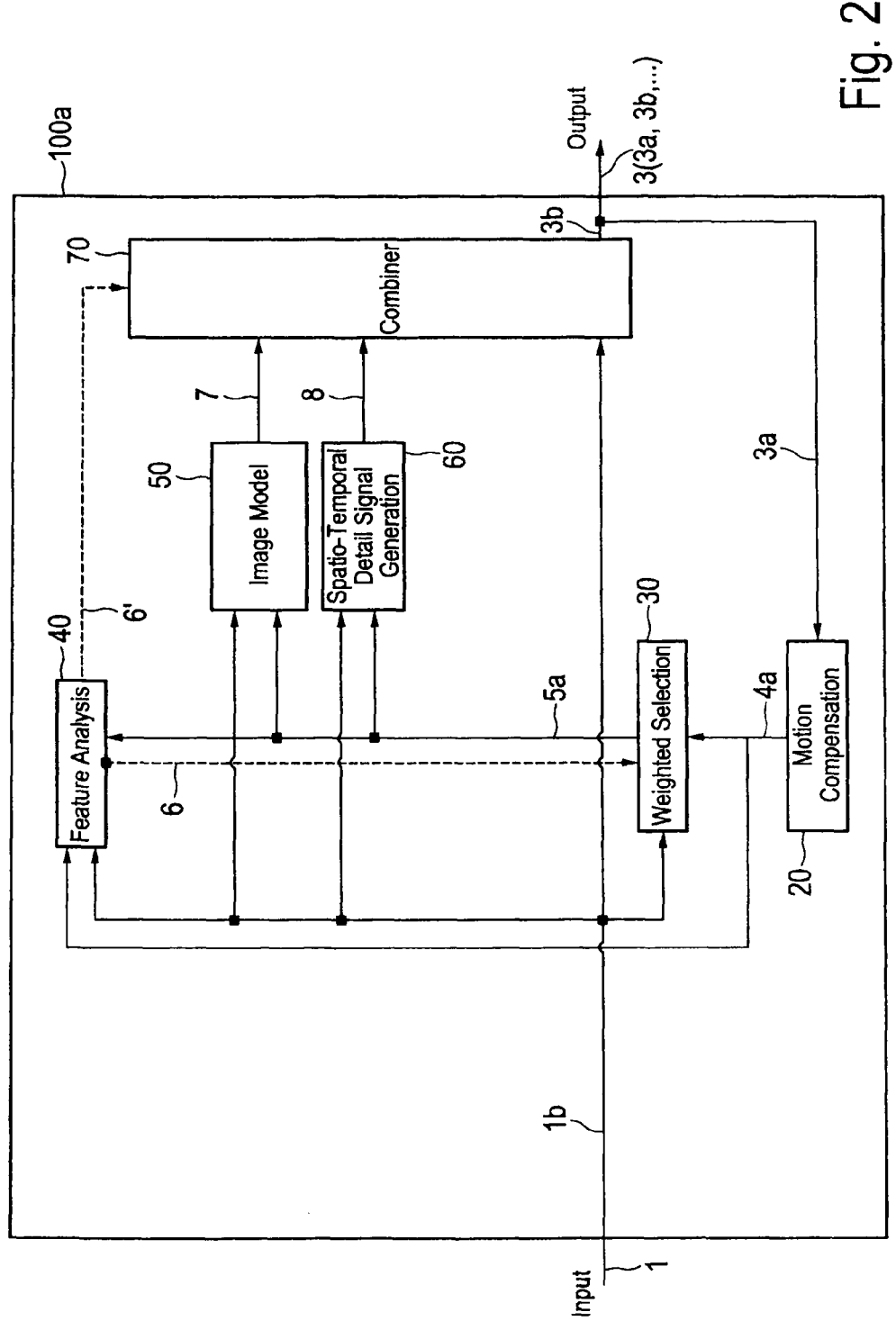
FIG. 2 shows a first embodiment of an image enhancement apparatus according to the present invention.

FIG. 2 shows a first embodiment of an image enhancement apparatus 100a according to the present invention illustrating more details of the general concept. By the indices a, b, . . . of the respective signals a particular state and the relations in time shall be indicated. The apparatus 100a comprises a motion compensation unit 20 configured to generate at least one preceding motion compensated image 4a by compensating motion in a preceding output image 3a and a weighted selection unit 30 configured to generate a weighted selection image 5 from said input image 1b and said preceding motion compensated image 3a, both being weighted by a respective selection weighting factor. A feature analysis unit 40 is provided which is configured to analyse at least the input image 1b and to generate feature information 6, 6' by segmenting the input image 1b into two or more input image regions having different features. An image model unit 50 is provided which is configured to generate a modelled image 7 by applying an image model, in particular a Huber Markov image model, on said input image 1b and/or said weighted selection image 5, and a spatio-temporal detail signal generation unit 60 is provided which is configured to generate a detail signal 8 from said input image 1b and said weighted selection image 5a. Finally, a combination unit 70 is provided which is configured to generate said enhanced output image 3b by combining said input image 1b, said detail signal 8 and said modelled image 7.

Figure 3:
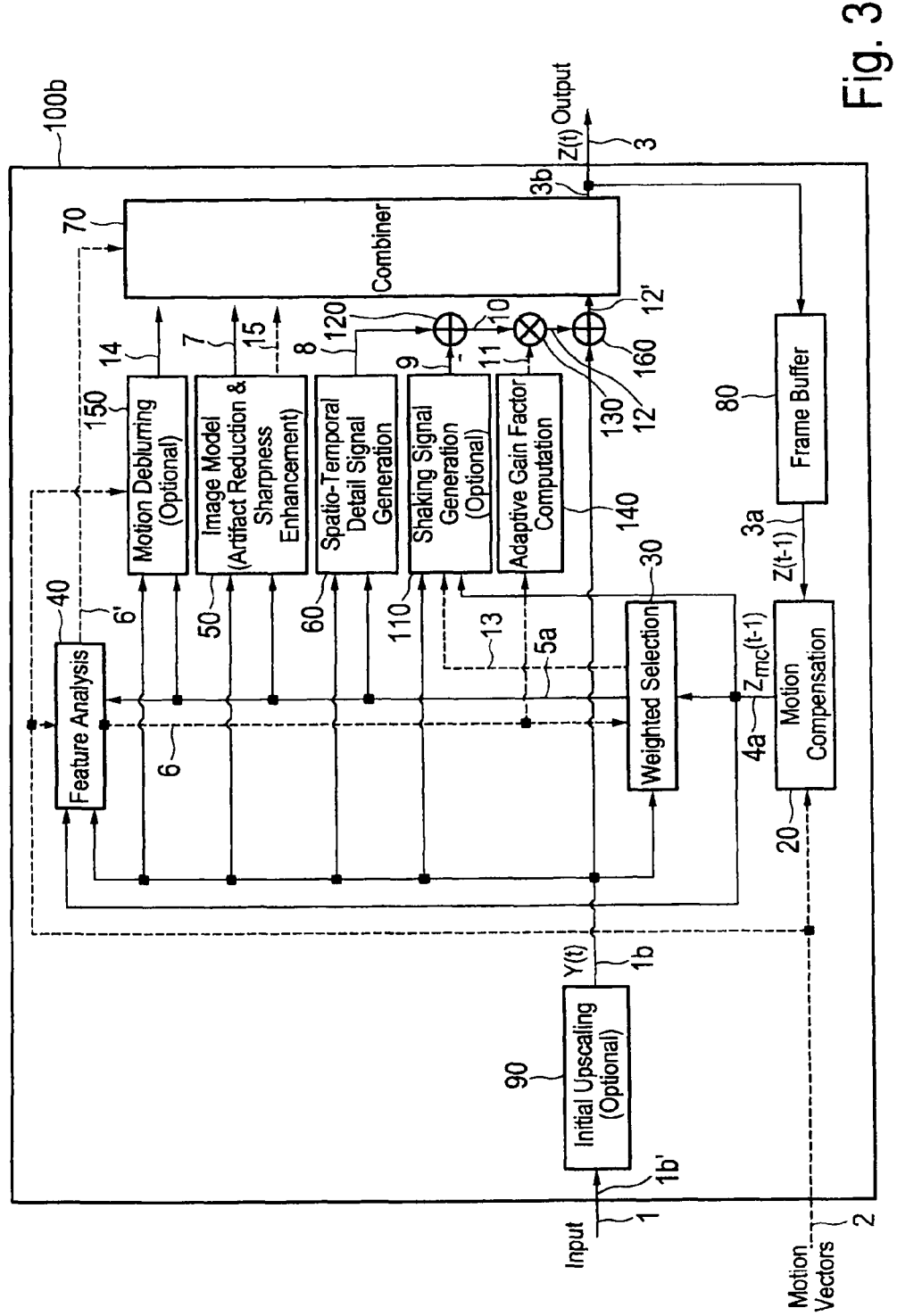
FIG. 3 shows a second embodiment of an image enhancement apparatus according to the present invention.

FIG. 3 shows a second, more detailed embodiment of an image enhancement apparatus 100b according to the present invention. The current input image 1b of the input sequence 1 is also called Y(t) in the following (t being the time), and the current output image 3b of the output sequence 3 is also called Z(t) in the following. For the current processing step also the output image 3a of the previous processing step, also called Z(t−1), is available. For this purpose, after image enhancement the output image 3a is written to a frame buffer 80, so that it can be used to process the subsequent input image 1b of the input sequence 1.

This preceding output image 3a is motion compensated by the input motion vectors 2 in the motion compensation unit 20, so that the objects in the current input image 1b (=Y(t)) and in the motion compensated preceding output image 4a (=$Z_{mc}$(t−1)) are located at the same position. If the input motion vectors 2 are sub-pixel accurate, a bilinear interpolation is preferably used for motion compensation. The motion compensated preceding output image 4a and the current input image 1b are then combined using the weighted selection unit 30.

The local image features of the input image 1b, the motion compensated output image 4a and the weighted selection image 5a are analyzed inside the feature analysis unit 40 to generate feature information 6, 6', in particular feature maps, describing the local features. This feature information 6, 6' is preferably used in one or more other units of the image enhancement apparatus 100b to realize a content adaptive image enhancement. The features of the input image 1b are also used inside the weighted selection unit 30 to realize a content adaptive weighting function of the input image 1b and the motion compensated output image 4a.

If the current input image does not have the desired spatial output resolution, an initial upscaling is used in an upscaling unit 90 to upscale an input image 1b' and obtain an upscaled image 1b that has the desired output resolution. Therefore this initial upscaling unit is optional, depending on the input resolution and the desired output resolution. For upscaling known methods like High Resolution Spline Upscaling (HRS Upscaling), interpolation algorithms or algorithms using trained filters can e.g. be utilized.

The input motion vector field 2 preferably needs to have the spatial resolution of the output image 3a. Therefore, preferably a preliminary resampling and length correction (not shown) of the motion vector field 2 is performed.

There are at least two main subsystems for image enhancement. The first main subsystem is the spatio-temporal image enhancement. Based on the input image 1b and the weighted selection image 5a a content adaptive spatio-temporal detail signal is generated by the spatio-temporal detail signal generation unit 60. Optionally, a shaking signal generation unit 110 is provided which computes, from the input signal 1b and the motion compensated preceding output signal 4a by use of a weighting factor 13 provided by the weighted selection unit 30, the components of the detail signal that are influenced by sub-pixel motion vector errors, resulting in stable details at wrong image positions. This is preferred if only pixel accurate motion estimation is realized as a preprocessing step. This shaking signal 9 is subtracted from the spatio-temporal detail signal 8 in a subtraction unit 120. The remaining detail signal 10 is then multiplied in a multiplier 130 by a locally content adaptive gain factor 11 that is generated by an (optional) adaptive gain factor computation unit 140, preferably using the feature information 6. The resulting detail signal 12 is added in a summation unit 160 to the input signal 1b resulting in a final spatio-temporal enhanced image signal 12'.

The second main subsystem is the image model (spatial artifact reduction and sharpness enhancement). The image model unit 50 is preferably based on the Huber-Markov Random Field image model. A local analysis method is used based on which a sharpness enhancement or a directional low-pass filtering is carried out, spatially reducing noise and staircase artifacts and sharpening edges.

Preferably, a third main subsystem for motion deblurring is provided. The motion deblurring unit 150, receiving as input the input image 1b and the weighted selection image 5a, reduces the motion blur present in fast moving image sequences. The motion vector information 2 is used to control the filter kernel utilized for image enhancement. The deblurred image 14 is also provided to the combination unit 70.

The results of the various image enhancement subsystems are combined in the combination unit 70, based on a control factor 15 generated by the image model unit 50 and the motion vector length if the motion deblurring is used.

The various units of the image enhancement apparatus, as used in the various embodiments, are separately described in the following. It shall be noted that the following description and figures are only to be understood as exemplary embodiments.

Figure 4:
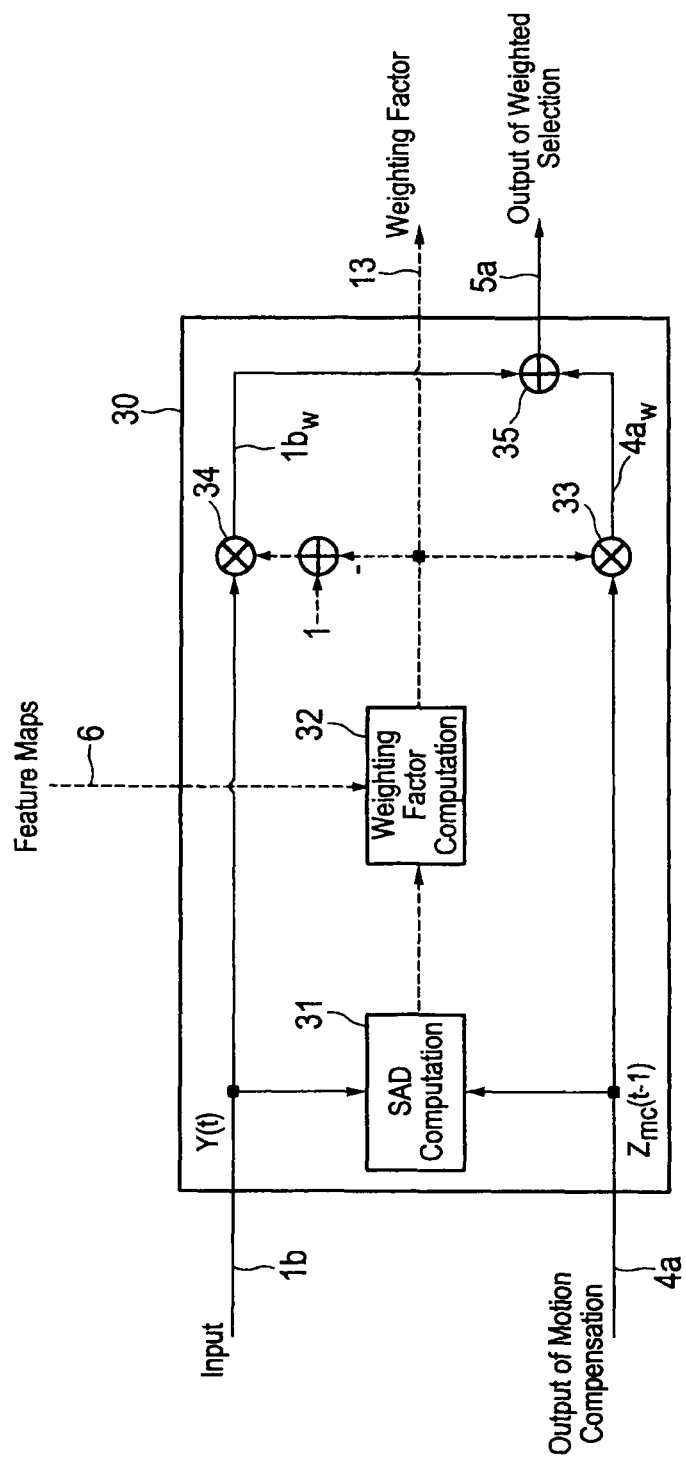
FIG. 4 shows an embodiment of a weighted selection unit.

FIG. 4 shows an embodiment of a weighted selection unit 30. The weighted selection unit 30 computes a combined signal 5a from the input signal 1b (Y(t)) and the motion compensated previous output signal 4a ($Z_{mc}$(t−1)). In case of reliable motion vectors the motion compensated previous output signal 4a shall be stronger weighted than the input signal 1b, and in case of unreliable motion vectors the input signal 1b shall be stronger weighted to avoid a strong influence of motion vector errors on the output. Therefore the weighting factor 13 is computed based on the local summed absolute difference (SAD), which is computed by SAD computation unit 31, in particular inside a local 3×3 block area. A high SAD describes a strong local difference between the input signal 1b and the motion compensated previous output signal 4a, which indicates a motion vector error. This assumption does not consider that in flat areas motion vector errors result in smaller differences between the input signal 1b and the motion compensated previous output signal 4a than in textured areas. Therefore, in the weighting factor computation unit 32 also a flat area feature map (as explained below and included in the feature information 6) is preferably utilized for the computation of the weighting factor 13, allowing bigger differences in detail areas than in flat areas for strongly weighting the motion compensated previous output signal 4a. Furthermore, it is assumed that large motion vectors indicate unreliable or erroneous motion vectors. Therefore, a motion vector length feature map (as explained below and included in the feature information 6) is preferably also utilized for weighting factor computation, resulting in a strong weighting of input signal 1b. This results in the following equation for the weighting factor computation:

$$weightingFactor = mvFactor \cdot \frac{\lambda_{temp} + \lambda_{temp,adapt} \cdot flatMap}{1 + SAD}$$

wherein $\lambda_{temp}$ (e.g. ranging from 2 to 15) and $\lambda_{temp,adapt}$ (e.g. ranging from 0 to 10) are predefined control parameters, e.g. set by the user. mvFactor is computed depending on the motion vector length map. SAD is the summed absolute difference computed over a block of e.g. 3×3 pixels between current upscaled low resolution input image 1b' and preceding motion compensated high resolution image 4a. It is set to 1 below a first motion vector length threshold and decreases until 0 above a second threshold.

For computation of the weighted selection image 5a the motion compensated previous output signal 4a is multiplied in a first multiplication unit 33 with the weighting factor 13 and the input signal 1b is multiplied in a second multiplication unit 34 with one minus the weighting factor 13. The resulting weighted signals $4a_w$ and $1b_w$ are then summed up in a summation unit 35 and used as the weighted selection signal 5a of the weighted selection unit 30. Furthermore, the weighting factor 13 is forwarded, so that it can be used in other units.

Figure 5:
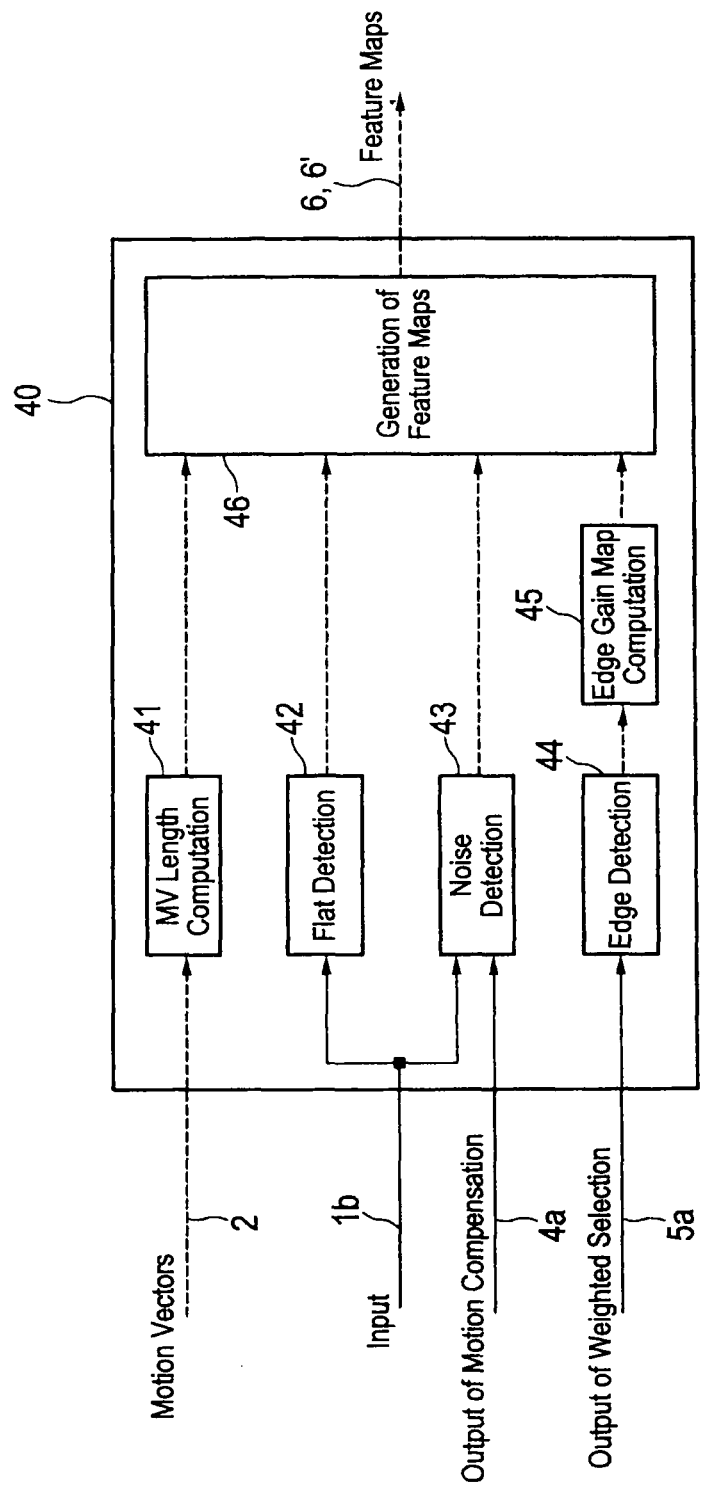
FIG. 5 shows an embodiment of a feature analysis unit.

FIG. 5 shows an embodiment of a feature analysis unit 40. In the feature analysis unit 40 preferably four different feature maps as feature information 6, 6' are generated in a feature map generation unit 46 based on the motion vector information 2, the input signal 1b (Y(t)), the motion compensated previous output signal 4a ($Z_{mc}$(t−1)) and the weighted selection image 5a, i.e. the feature map generation unit 46 is combining several input signals into a single concatenated stream. These feature maps are:

a) Motion Vector Length Map: The motion vector length map is computed from the motion vectors 2 ($mv_x$ and $mv_y$), whose lengths are computed in a motion vector length computation unit 41, by the equation:

$$mvMap = \sqrt{mv_x^2 + mv_y^2}$$

b) Flat Map: For the flat map computation, after detection of flat areas in the input image 1b in a flat detection unit 42, the absolute local Laplacian is computed and summed up over a 5×5 block area. Between a lower and an upper threshold the computed sum is mapped to values between 0 (flat area) and 1 (texture area).

c) Noise Map: The noise map is generated, after detection of noise areas in the input image 1b and the motion compensated previous output signal 4a in a noise detection unit 43, by computing a combined local standard deviation from the input signal 1b and the motion compensated previous output signal 4a. The local mean value is computed inside a 5×5 block area for both images. Then the combined local standard deviation is computed indicating the level of noise inside the block. The resulting values are mapped to values between 0 and 1.

d) Edge Gain Map: For edge gain map computation in an edge gain map computation unit 45, after detection of edge areas in the weighted selection image 5a in an edge detection unit 44, the edge strength is detected based on the output 5a of the weighted selection unit 30. Thus, also enhanced previously weak edges can be detected that would not be detected if the edge detection would be carried out on the input signal. For edge detection the absolute local gradient is computed and between a lower and an upper threshold it is mapped to a value between 0 (no edge) and 1 (strong edge). Then the edge gain map is computed by selecting the maximum edge value in a local 3×3 block area.

Figure 6:
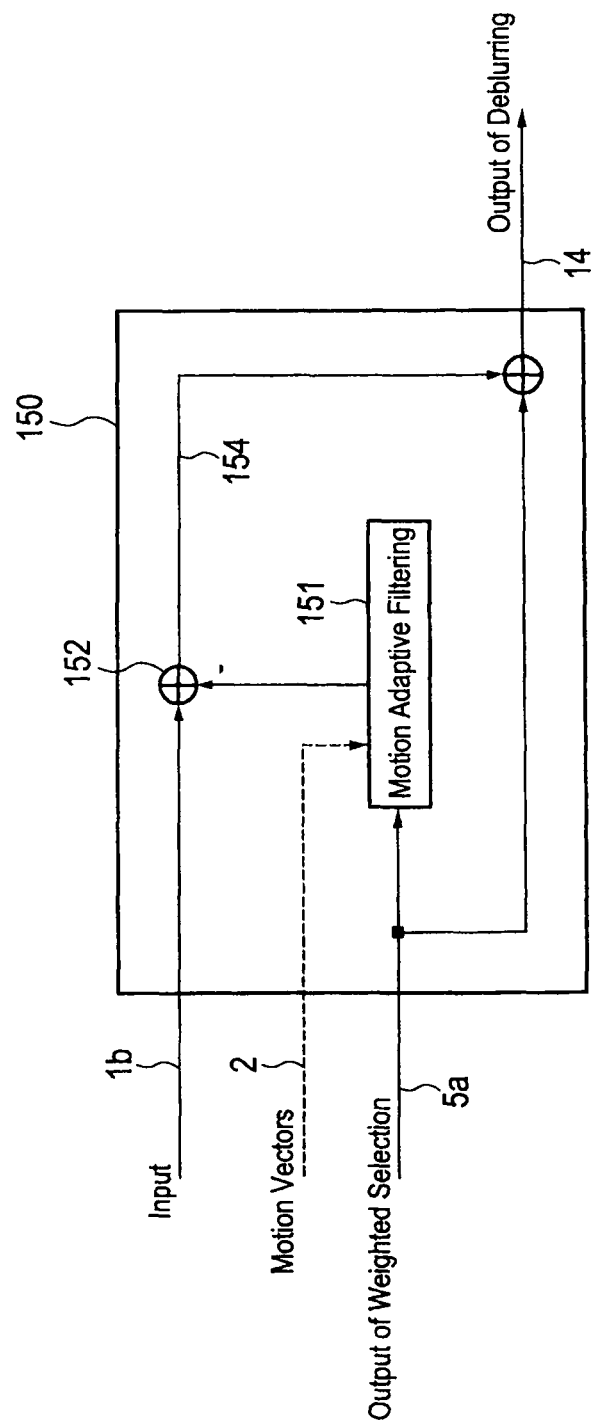
FIG. 6 shows an embodiment of a deblurring unit.

FIG. 6 shows an embodiment of a deblurring unit 150. The deblurring unit 150 reduces the motion blur of the weighted selection image 5a. A motion blur detail signal 154 is generated by low pass filtering the weighted selection image 5a in a motion adaptive filter 151 using the motion vector information 2 and subtracting it from the input signal 1b in a subtraction unit 152. The low pass filter kernel is computed adaptively to the motion vector direction. A stronger filtering is carried out for fast motions than for slow ones. This is preferably realized by using a mean filter with a motion vector dependent number of filter coefficients. The generated detail signal 154 is then added to the weighted selection image 5a to realize the motion deblurring, i.e. output the deblurring signal 14.

FIG. 7 shows an embodiment of an image model unit 50. The image model shall have the property to reduce noise in homogenous regions, smooth jaggies at edges and sharpen the transitions of an edge. The embodiment of the image model depicted in FIG. 7 has the property to enhance the sharpness in edge regions and to smooth out staircase artefacts. This image model is an example for a purely spatial processing. An image model is generally e.g. described in S. Borman and R. Stevenson, "Simultaneous Multi-frame MAP Super-Resolution Video Enhancement using Spatio-temporal Priors, IEEE Int. Conference on Image Processing, 1999. Mathematically, it is a constraint to make a solution of the mathematical approach (energy functional) in the minimization process unique.

The image model unit 50 comprises an adaptive low-pass filter bank unit 51 for filtering weighted selection image 5a with four different filters in the direction of the four dominant directions, using for example 3-tap mean filters oriented in the four directions. The filter results are forwarded to a multiplexer (MUX) unit 52. For high frequency signal generation the Laplacian is computed in all four dominant directions and multiplied with a control factor k in a high frequency detail signal generation unit 53. The control factor k is an external parameter with a preferred value range between 0.2 and 2. By using the control factor k the spatial sharpness enhancement inside the image model can be influenced. Also these results are forwarded to the MUX unit 52. To detect edge regions and directions inside a control unit 54, the idea is to use the second derivative, which is computed in the four main edge directions by $$d(z) = z_{i+di, j+dj} - 2x_{i,j} + z_{i-di, j-dj}$$

wherein di and dj are set to the values −1, 0, 1, respectively, allowing the description of the four main directions.

If only a three by three pixel region is utilized to compute the second derivative, depending on the input situation the main edge direction cannot be estimated correctly since the second derivatives in all four directions are large, as illustrated in the diagram shown in FIG. 8. A solution to this problem is the introduction of a three difference scheme as illustrated in the diagram shown in FIG. 9. In this case, at least the inner and outer second derivative results in low values. Further, by comparing the absolute sum of the three second derivatives along (FIG. 9A) and across (FIG. 9B) edge direction allows accurate edge direction detection.

Depending on the results of the edge detection and direction detection, the MUX unit 52 selects four of its input results and sums up these results in a combination unit 55. For example in case of a strong edge with a dominant direction only one low pass filter result for the dominant direction and three high frequency detail results are forwarded, resulting in a smoothing in edge direction and an additional sharpness enhancement. In flat regions only low pass filter results are forwarded to realize a noise reduction. The number of forwarded low pass results is forwarded to the combination unit 70 of the image enhancement apparatus 100b as the low-pass results contain a DC component, which should be the same for the output image 3b and the input image 1b.

If the edge direction is estimated correctly, efficient smoothing along edge direction is possible to reduce staircase artefacts. Further improvements can be achieved by utilizing a more complex image model, e.g. by using trained filters or the principal components analysis to classify the edge direction or even more complex features and then enhance the image in the best manner. This can lead to an even higher reduction of artefacts.

Figure 10:
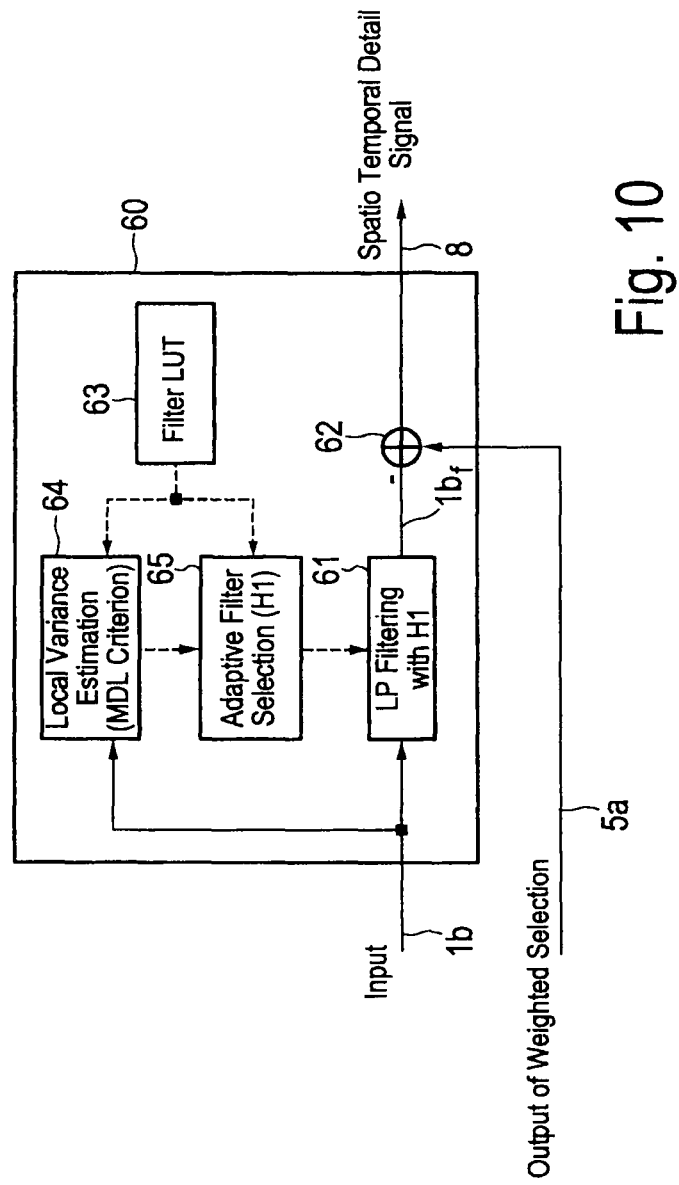
FIG. 10 shows an embodiment of a spatio-temporal detail signal generation unit.

FIG. 10 shows an embodiment of a spatio-temporal detail signal generation unit 60. According to this embodiment 60 of the spatio-temporal detail signal generation unit the spatio-temporal detail signal is generated by subtracting the low pass filtered input signal $1b_f$ (obtained by filtering the input signal 1b in a LP filter 61) from the weighted selection image 5a in a subtraction unit 62. This idea has a similarity to a sharpness enhancement method called unsharp masking. The difference in the present approach is that two different signals are combined to generate the detail signal 8. Furthermore the detail signal 8a is computed adaptively to the local image frequencies. In image areas with high frequencies only the high frequencies shall be emphasized while in low and medium frequency areas also these frequencies shall be accentuated. Therefore the local frequencies are analysed using a method to estimate the local variance of an optimal filter kernel.

The image is filtered with several Gaussian filters with different variances that are available in a filter look-up table (LUT) 63. For each filtered image the difference between the input signal 1b and the low pass filtered images is computed using the mean square error (MSE). This is done in the local variance estimation unit 64. Then the optimal variance is selected in a local variance estimation unit 64 (applying an MDL (minimum description length) criterion) by minimizing the description length criterion depending on the optimal local variance, which is generally known in the art and e.g. described in G. G. Estrada, "Local smoothness in terms of variance: the adaptive Gaussian filter," Proc. of the 11th British machine vision convergence, vol. 2, pages 815-824, 2000, as follows:

$$d1 = \left(\frac{\lambda}{\sigma_x^2}\right) + q \cdot MSE$$

The parameters λ and q control the curve characteristics of the description length curves for the different variances $\sigma_x^2$ and dl means the description length. This optimal local variance is used to locally select in the adaptive filter selection unit 65 the optimal filter kernel H1 from the LUT 63 for filtering the input signal 1b in the LP filter 61. If the filter kernels used for local variance estimation and for selection of H1 are equal, the internal filter results of the local variance estimation can directly be used as result of the LP filter 61 to save additional effort for filtering.

Figure 11:
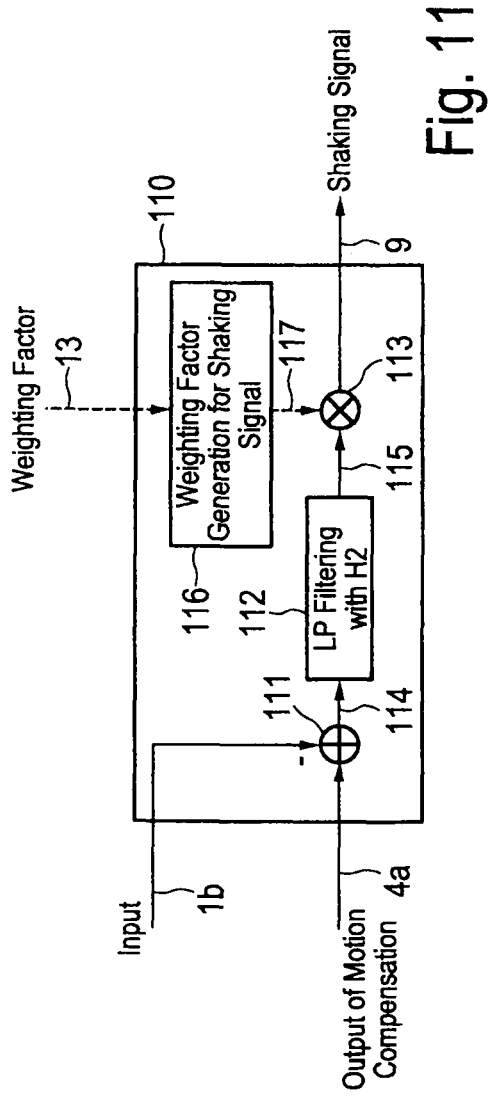
FIG. 11 shows an embodiment of a shaking signal generation unit.

FIG. 11 shows an embodiment of a shaking signal generation unit 110. To reduce the influence of motion vector errors on the generated detail signal, the components of the detail signal containing the most visible motion vector errors (also called "shaking") shall be removed. Therefore a shaking signal 9 is generated containing these components. Experiments have shown that these components dominantly exist in the low frequency components of the detail signal coming from the motion compensated result of the previous motion compensated output image 4a. Therefore this part of the detail signal is generated by subtracting the input signal 1b from previous motion compensated output image 4a in a subtraction unit 111 and low pass filtering this intermediate detail signal 114 with a Gaussian filter (H2) 112 that is computed using a bigger variance than the biggest variance used for the H1 filters. This low pass filtered detail signal 115 is then multiplied in a multiplication unit 113 with a weighting factor 117 generated by a weighting factor generation unit 116 from the weighting factor 13 computed by the weighted selection unit 30.

Figure 12:
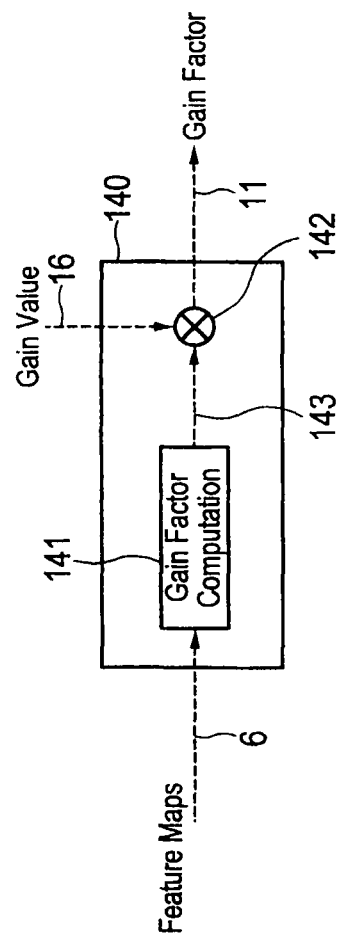
FIG. 12 shows an embodiment of a gain factor computation unit.

FIG. 12 shows an embodiment of a gain factor computation unit 140. The gain factor 11 is computed locally adaptive based on the feature information 6, in particular based on several feature maps. In an adaptive gain computation unit 141 a gain 143 between zero and one is computed that is multiplied in a multiplication unit 142 with a global gain value 16 which is chosen (e.g. manually by the user) to define the level of enhancement. Another possibility is the computation of a global gain value which is matched to the detail level of the input image and the current enhancement level.

For computation of the locally adaptive gain, the local requirements for image enhancement are considered. In flat areas and areas showing a strong visibility of noise, only a weak detail signal shall be generated, and only a temporal noise and artefact reduction shall be applied, but the noise signal shall not be emphasized by spatially generated details. This is realized by weighting down the gain factor based on the flat map and the noise map. In edge areas also only a weak sharpness enhancement shall be carried out, otherwise strong overshoots around edge would be generated. Therefore in edge areas the gain is weighted down using the edge gain map. This results in the following preferred equation for the adaptive gain computation:

$$\text{gainFactor} = \text{gainValue} \cdot (1 - \text{edgeGainMap}) \cdot \text{flatMap} \cdot \text{noiseMap}$$

Figure 17:
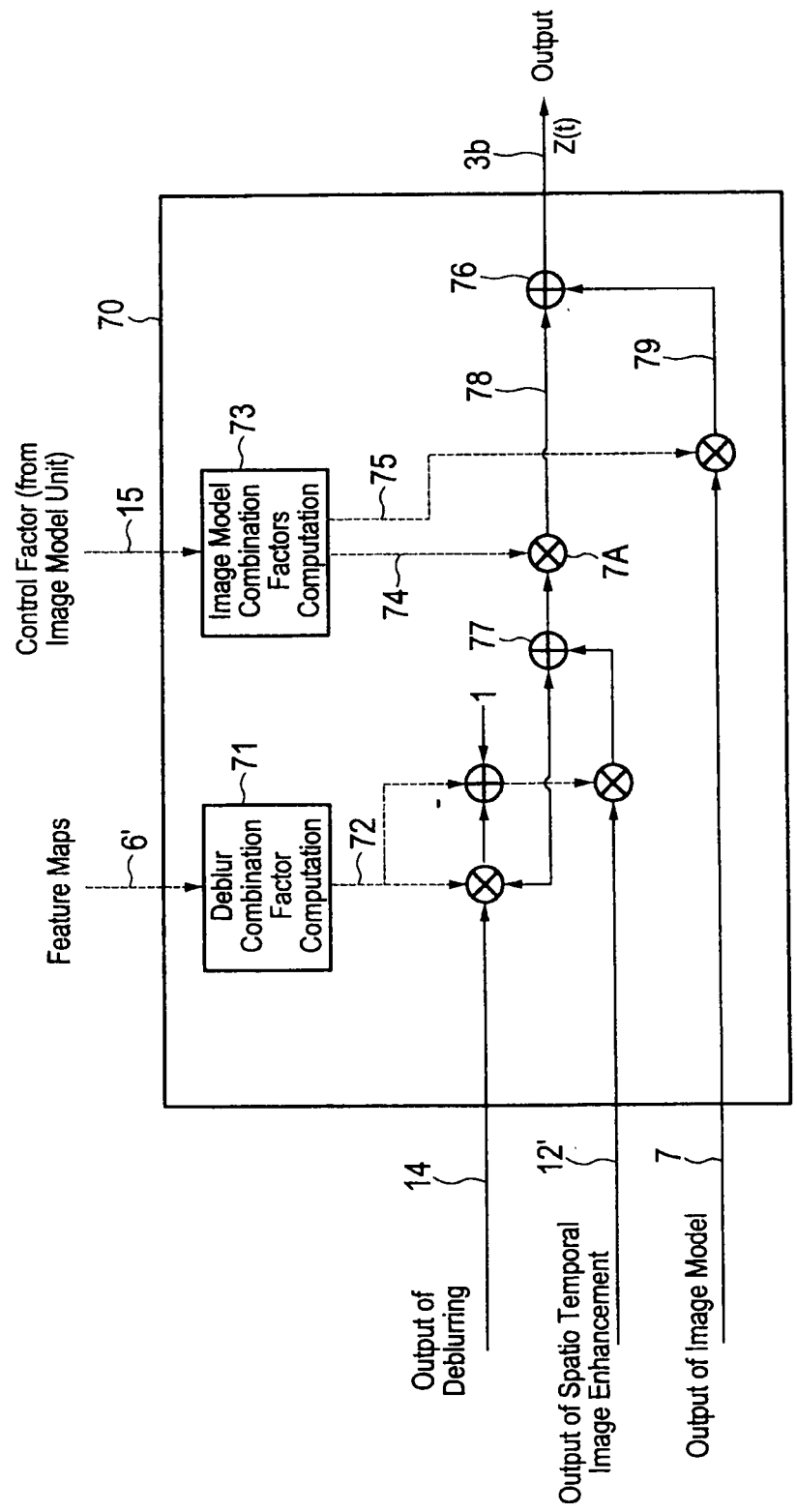
FIG. 17 shows an embodiment of a combination unit.

FIG. 17 shows an embodiment of the combination unit 70. The combination unit 70 combines the output signals 7, 12', 14 of the different image enhancement units by weighting them with internally computed weighting factors 72, 74, 75 by an image model combination factors computation unit 73 and summing up the different weighted signals in a summation unit 76.

If a deblurring unit is used, a deblur combination factor 72 is computed in a deblur combination factor combination unit 71 based on the motion vector-length feature map 6'. Above an upper motion vector length threshold (e.g. 20 px) this weighting factor 72 is set to a maximum value (e.g. 0.8). This value decreases linear to zero with a decreasing motion vector length. The deblurred image 14 is multiplied with this factor 72 while the final spatio-temporal enhanced image signal 12' (output of the spatio-temporal enhancement unit) is multiplied with one minus this factor 72. The weighted signals are summed up in the summation unit 77. The effect of this weighting function is that for high motion speed dominantly the result from the deblurring unit contributes to the final output signal 3b while for a small motion speed dominantly the result from the spatio temporal image enhancement unit contributes to the final output signal 3b.

If no deblurring is carried out, the final spatio-temporal enhanced image signal 12' (output of the spatio-temporal enhancement unit) is just forwarded. The result of this weighting procedure is further combined with the image model output 7 to generate the final output signal 3b. The image model weighting factors 74, 75 are computed based on the control factor 15 outputted by the image model unit and a regularization factor. This control factor k describes the number of DC components contributing to the output of the image model. One of the image model weighting factors 75 is set to $1/(2\beta)$, with $\beta$ being a regularization factor for controlling the contribution of the image model to the final output image with a value between 2 and 25. The output 7 of the image model unit is multiplied with this factor 75. The output of the summation unit 77 is multiplied in a multiplier 7A with a second weighting factor 74 which is set to $1/(k/(2\beta)+1)$. The weighted signals 78 and 79 are summed up in the summation unit 76. The output of this summation is used as final output 3b of the image enhancement system.

FIGS. 13 to 16 depict several further embodiments of an image enhancement devices 100c to 100f, which are generally based on the general layout depicted in FIG. 2. These embodiments show the possible implementation that can be form with and without use of the above described optional units 150 and 110 for motion deblurring and shaking signal generation and other optional components described above.

Figure 13:
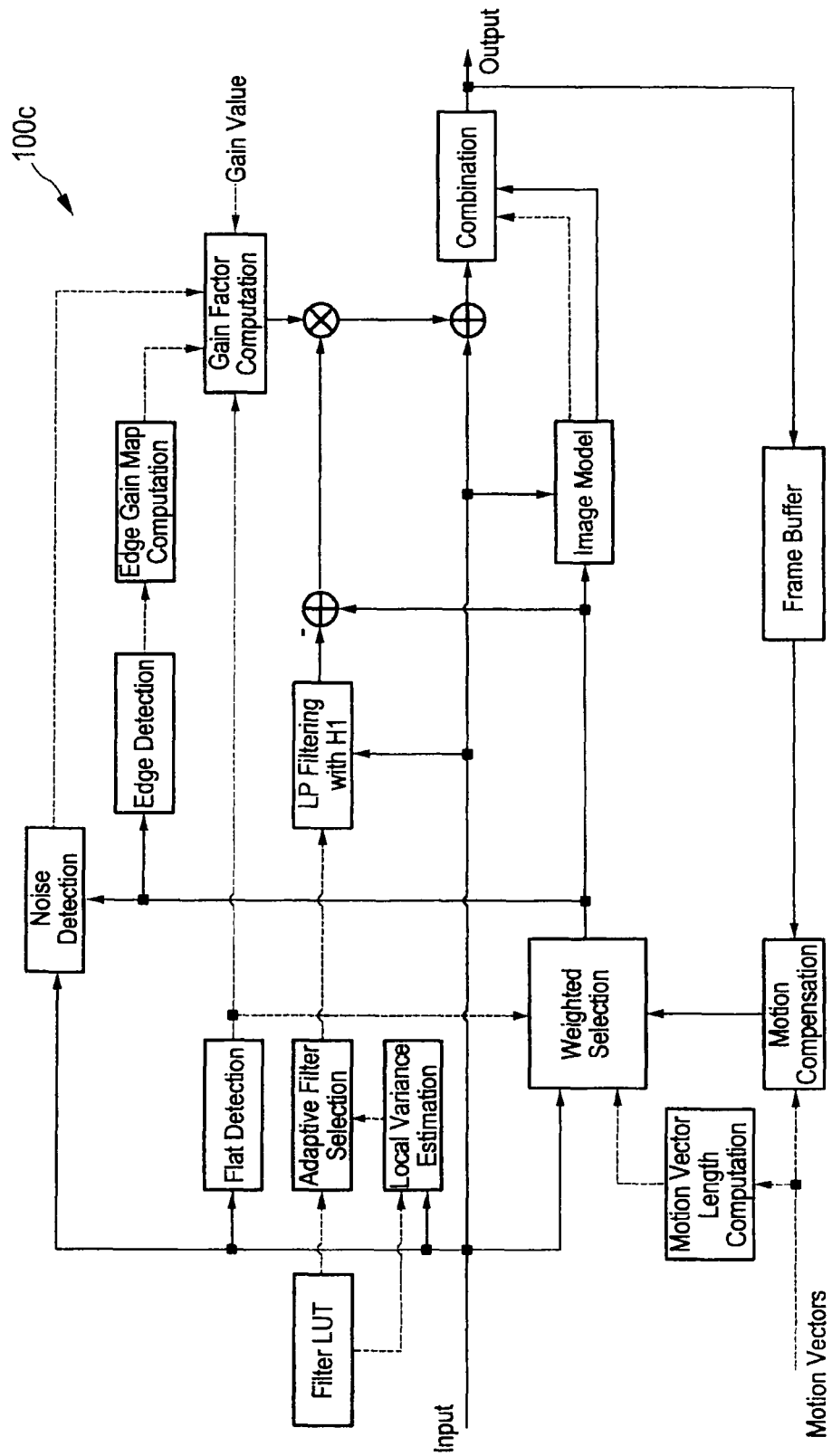
FIG. 13 shows a third embodiment of an image enhancement apparatus according to the present invention.

The embodiment 100c shown in FIG. 13 comprises no means for motion deblurring and shaking signal reduction. This embodiment 100c is preferably used if the input signal has the desired output pixel resolution and a preliminary motion deblurring is used. Furthermore a sub-pixel accurate motion estimation should be used to generate the input motion vectors, as motion artefacts coming from sub-pixel motion vector errors can not be reduced in this embodiment.

Figure 14:
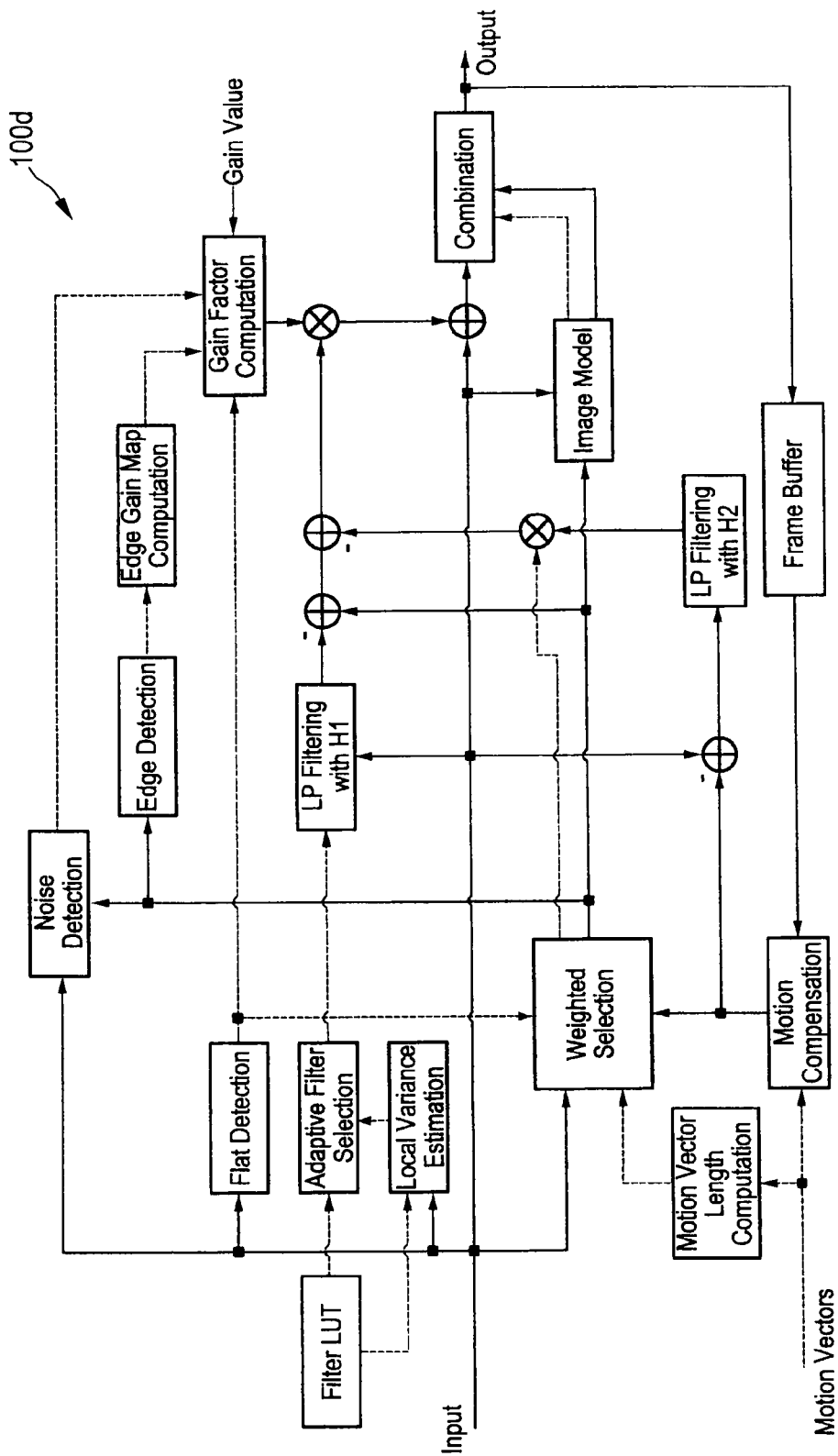
FIG. 14 shows a fourth embodiment of an image enhancement apparatus according to the present invention.

The embodiment 100d shown in FIG. 14 comprises integrated reduction of artefacts from sub-pixel motion vector errors. This embodiment 100d is preferably used if only pixel accurate motion vectors are available and a preliminary motion deblurring is carried out.

Figure 15:
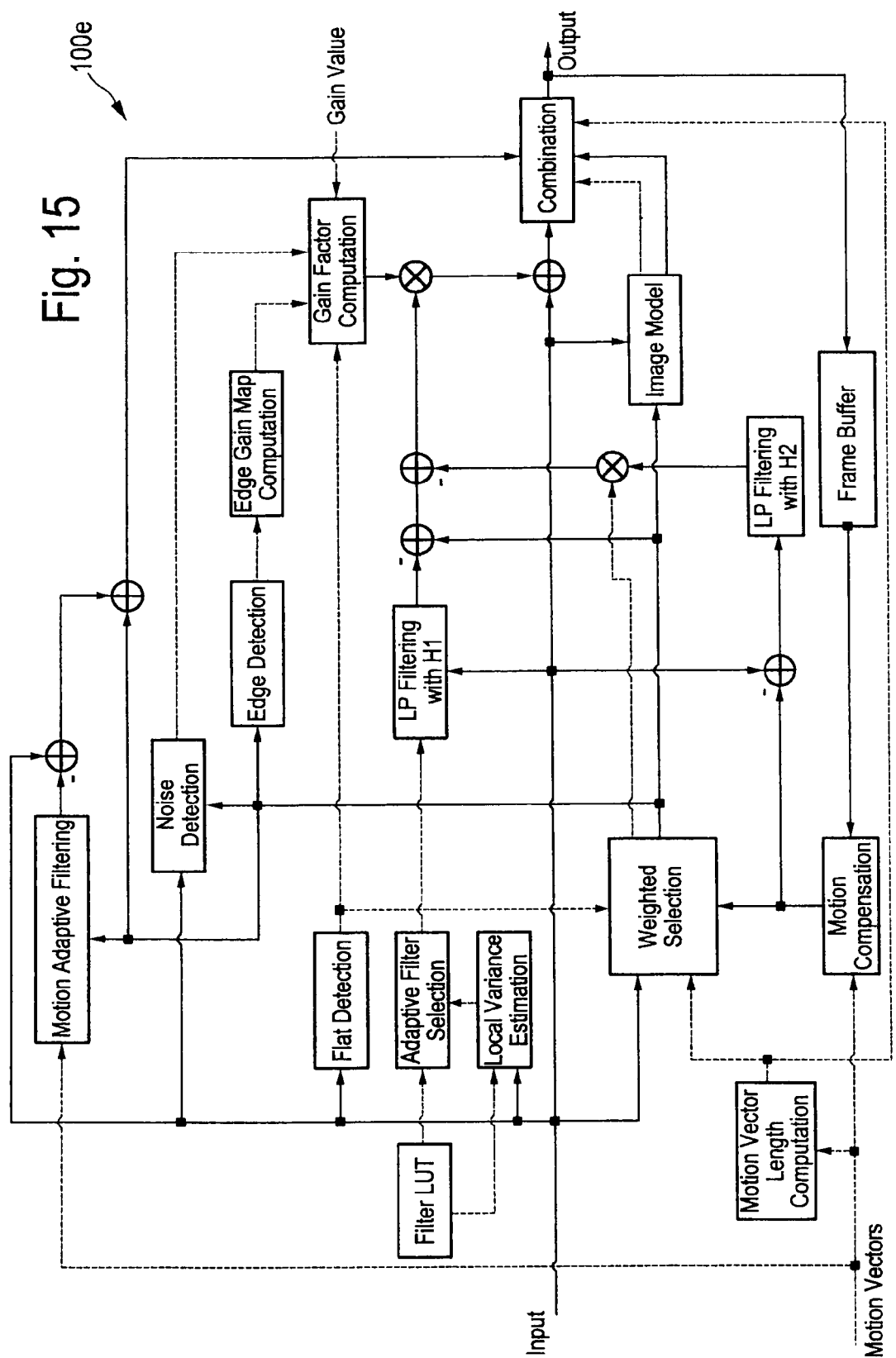
FIG. 15 shows a fifth embodiment of an image enhancement apparatus according to the present invention.

The embodiment 100e shown in FIG. 15 comprises integrated motion deblurring and reduction of artefacts from sub-pixel motion vector errors. This embodiment 100e is preferably used if no motion deblurring preprocessing is carried out and only pixel accurate motion vectors are available.

Figure 16:
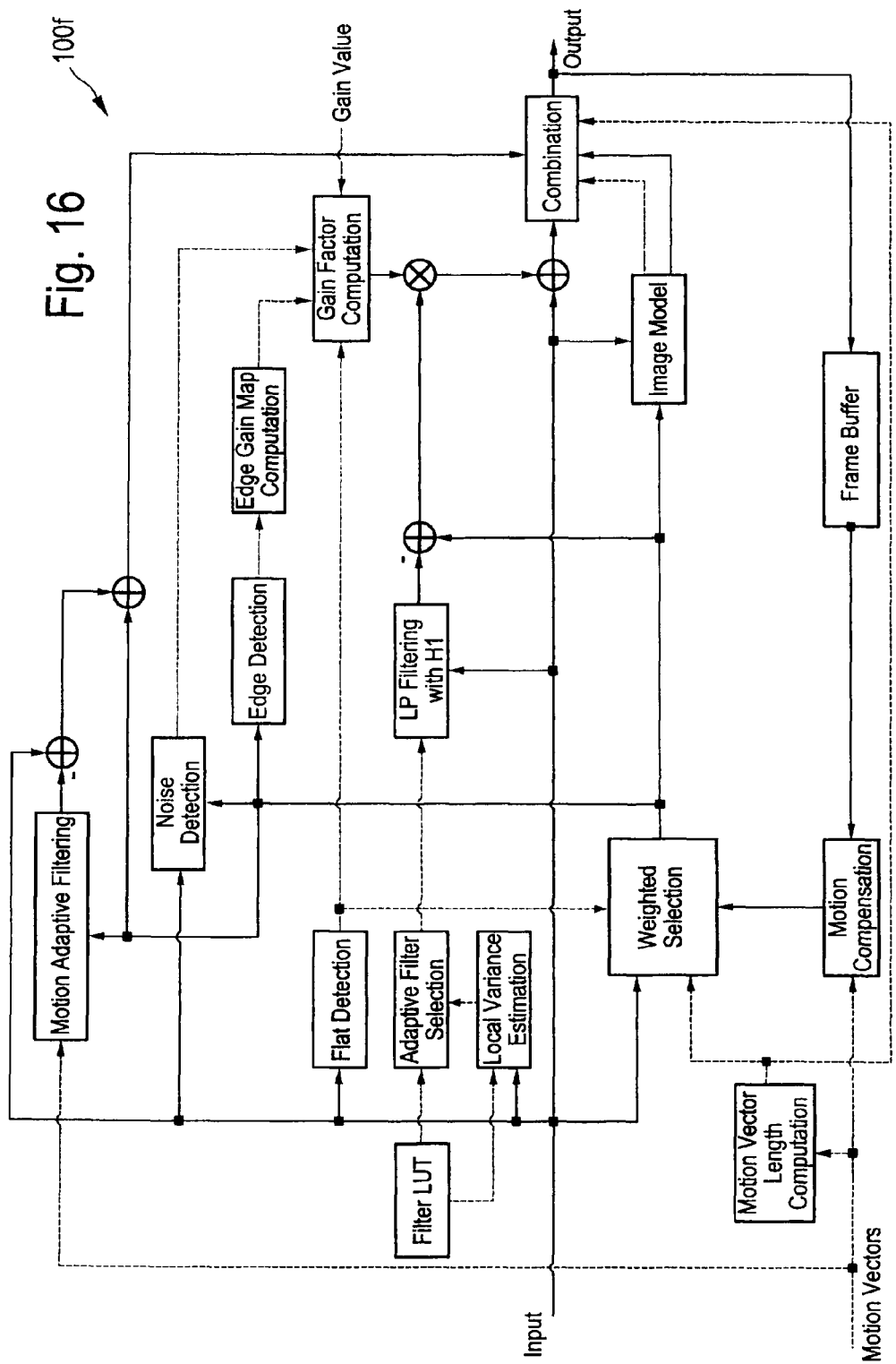
FIG. 16 shows a sixth embodiment of an image enhancement apparatus according to the present invention.

The embodiment 100f shown in FIG. 16 comprises integrated motion deblurring. This embodiment 100f is preferably used if no motion deblurring preprocessing is carried out and sub pixel accurate motion vectors are available.

It shall be noted that not all units and elements shown in the above embodiments need necessarily be provided in the shown combinations, but further embodiments and combinations are available. For instance, as shown in FIGS. 18 and 19 depicting two further embodiments 100g and 100h of the image enhancement apparatus, more elements than in the embodiment 100a shown in FIG. 2 but less elements than in the embodiment 100b shown in FIG. 3 are provided.

Figure 18:
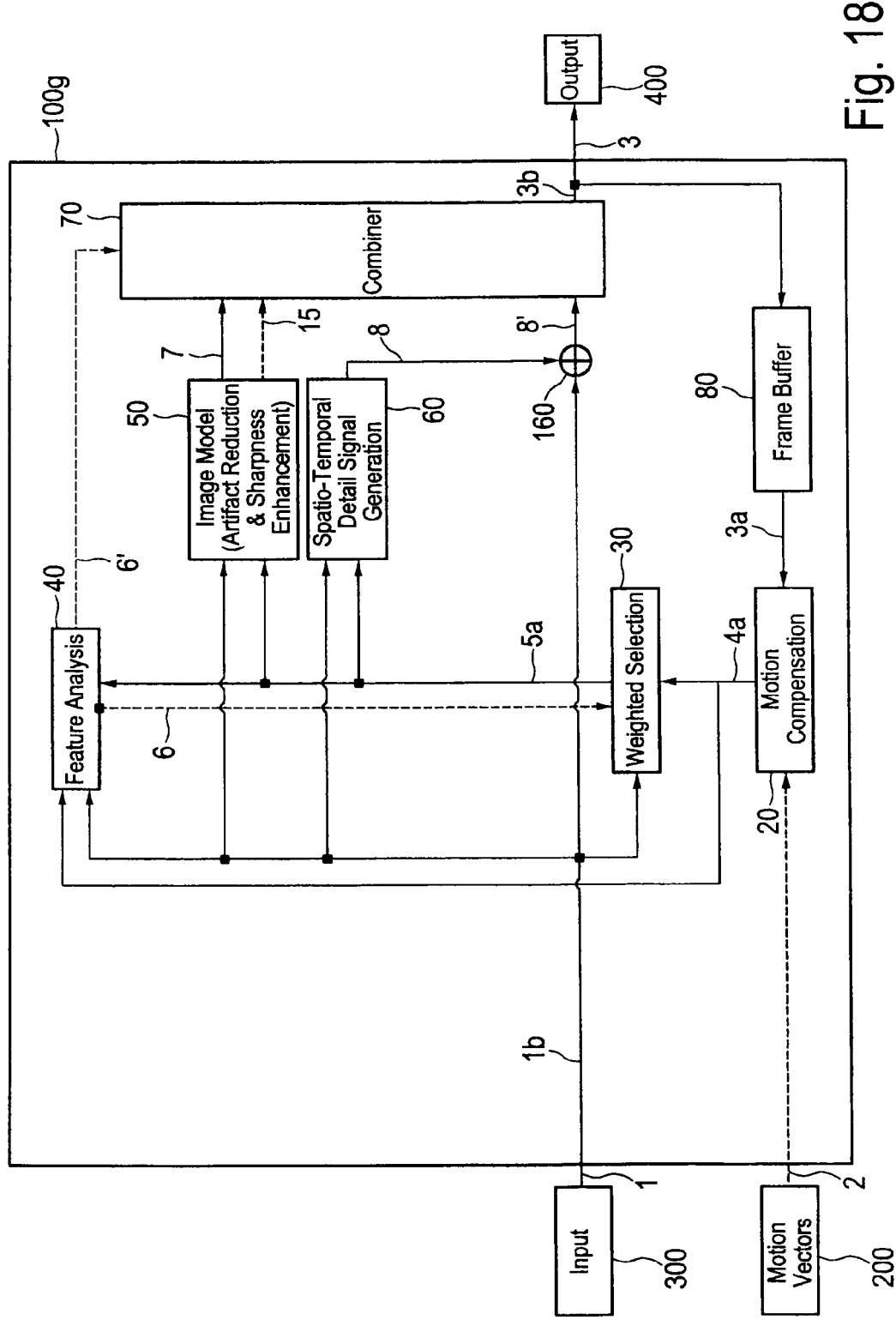
FIG. 18 shows a seventh embodiment of an image enhancement apparatus according to the present invention and FIG. 19 shows an eighth embodiment of an image enhancement apparatus according to the present invention.
Figure 19:
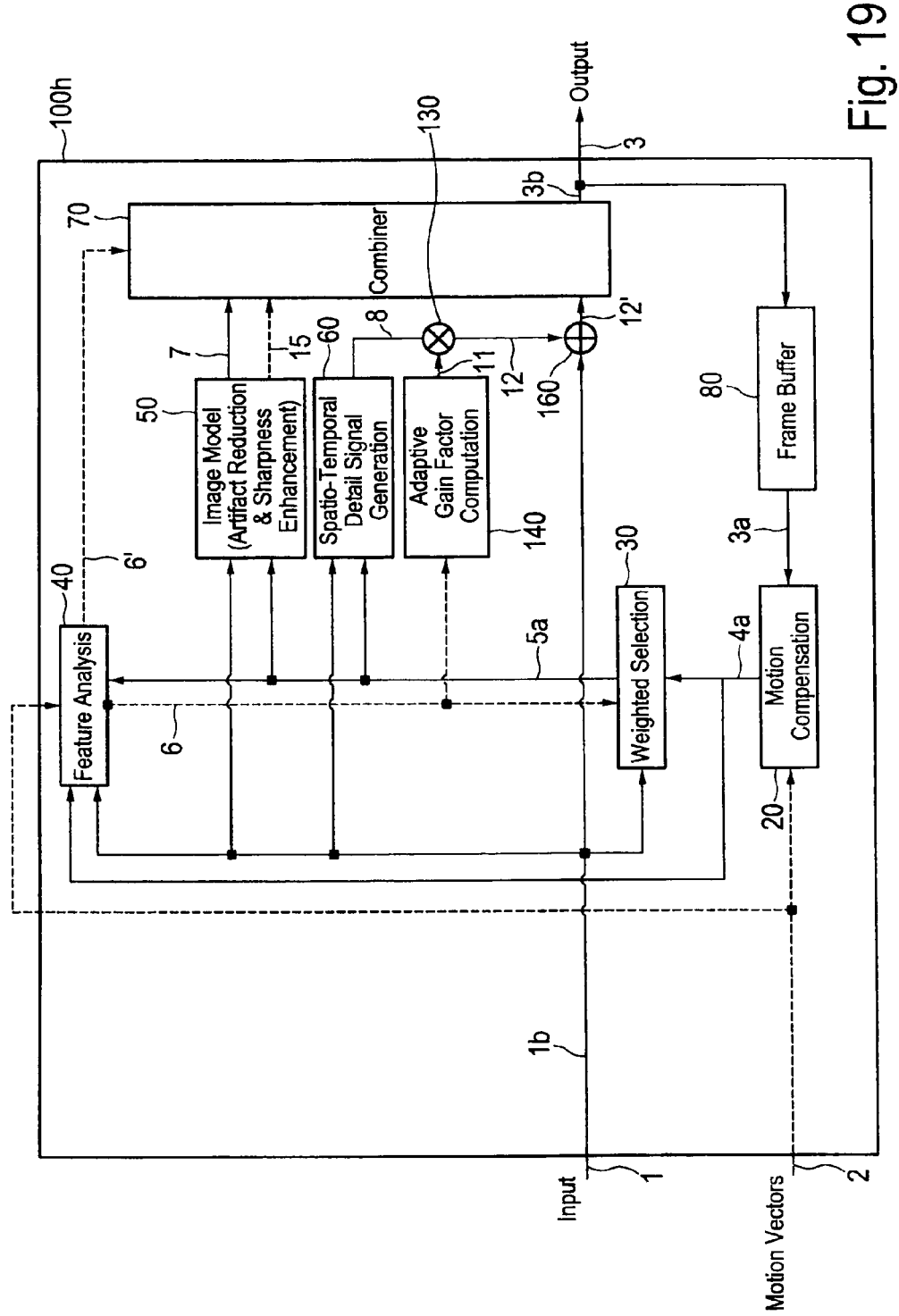

Furthermore, in the embodiment 100g depicted in FIG. 18 a high detail image 8' is generated by the summation unit 16 by adding said input image 1b and said detail signal 8, which high detail image 8' is then provided to the combination unit 70 for combination with the modelled image 7. Further, in the embodiment 100g a motion compensation information storage 200 storing the motion information 2, an input image storage 300 storing input images 1 and an output image storage 400 storing output images 3 are shown, which may, of course, also be provided in other embodiments.

Further, it shall be noted that explicit elements like the summation units 120, 160 and the multiplication unit 130 and/or their operations can be implemented partly or completely with the combination unit 70, e.g. in an integrated circuit implementing said combination unit 70.

Still further, the motion compensation performed by the motion compensation unit 20 is preferably based on motion information provided from an external, e.g. an external motion estimation unit (not shown) or the motion compensation information storage 200. The available motion vectors can be pixel accurate or sub-pixel accurate. In case of pixel accurate motion vectors the pixel values from $Z(t-1)$ ($3a$) are copied to the positions compensated by the motion vectors and stored to $Z_{mc}(t-1)$ ($4a$). In case of sub-pixel accurate motion vectors the well known bilinear interpolation is used to interpolate the pixel values for computation of in $Z_{mc}(t-1)$ ($4a$). However, in another embodiment the motion compensation information/the motion vectors 2 can also be generated by the motion compensation unit 20 if it is adapted for motion estimation. This motion estimation can e.g. be effected by a 3D recursive block-matching method (de Haan, G.; Biezen, P.W.A.C.; Huijgen, H.; Ojo, O. A. "True Motion Estimation with 3-D Recursive Search Block-Matching", IEEE Trans. on Circuits & Systems for Video Technology, October 1993, pp. 368-379).

The present invention can preferably be applied in a display device comprising an image enhancement apparatus as according to the present invention for enhancing an input image of a sequence of input images and obtaining an enhanced output image and a display for displaying said output image. Such a display device can e.g. be a monitor or TV set, such as a HD LCD-TV. For instance, in TV sets using the applicant's motion-flow technology, as e.g. described in EP 1855474 A1 and as used in various models of TV sets available on the market, the present invention can be used to further enhance the picture quality.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An image enhancement apparatus for enhancing an input image of a sequence of input images and obtaining an enhanced output image, said apparatus comprising:
   a motion compensation unit configured to generate at least one preceding motion compensated image by compensating motion in a preceding output image,
   a weighted selection unit configured to generate a weighted selection image from said input image and said preceding motion compensated image, both being weighted by a respective selection weighting factor,
   a feature analysis unit configured to analyse at least the input image and to generate feature information by segmenting the input image into two or more input image regions having different features,
   an image model unit configured to generate a modelled image by applying an image model, in particular a Huber Markov image model, on at least one of said input image said weighted selection image,
   a spatio-temporal detail signal generation unit configured to generate a detail signal from said input image and said weighted selection image, and
   a combination unit configured to generate said enhanced output image from said input image, said detail signal and said modelled image,
      wherein said weighted selection unit is configured to generate said weighted selection image by adding said input image after weighting it with a first selection weighting factor and said preceding motion compensated image after weighting it with a second selection weighting factor.

2. The image processing apparatus as claimed in claim 1, further comprising a frame buffer configured to buffer one or more preceding output images for use by said motion compensation unit.

3. The image processing apparatus as claimed in claim 1, wherein said weighted selection unit is configured to determine said respective selection weighting factors based on at least one of said feature information and the local summed absolute difference between said input image and said preceding motion compensated image.

4. The image processing apparatus as claimed in claim 1, wherein said weighted selection unit is configured to generate said first and second selection weighting factors such that the sum of said first and second selection weighting factors is 1.

5. The image processing apparatus as claimed in claim 1, wherein said feature analysis unit is configured to generate one or more feature maps as feature information, said one or more feature maps including one or more of a motion vector length map, a flat map, a noise map and an edge gain map.

6. The image processing apparatus as claimed in claim 5, wherein said feature analysis unit is configured to generate said motion vector length map from motion vector information describing the motion between successive input images.

7. The image processing apparatus as claimed in claim 5, wherein said feature analysis unit is configured to detect flat regions in said input image for generating said flat map.

8. The image processing apparatus as claimed in claim 5, wherein said feature analysis unit is configured to determine a combined local standard deviation from said input image and said preceding motion compensated image for generating said noise map.

9. The image processing apparatus as claimed in claim 5, wherein said feature analysis unit is configured to detect edges in said weighted selection image for generating said edge gain map.

10. The image processing apparatus as claimed in claim 1, wherein said image model unit comprises
a low pass filter bank unit configured to low-pass filter said weighted selection image,
a high frequency signal generation unit configured to generate a Laplacian from said input image,
a control unit configured to detect edge regions and directions in said input image,
a selection unit configured to receive the output of said low pass filter bank unit, said high frequency signal generation unit and said control unit and to select output data of at least one of said low pass filter bank unit and said high frequency signal generation unit based on detected edge regions and directions, and
an image model combination unit for combining, in particular adding, the selected output data of said low pass filter bank unit and/or said high frequency signal generation unit.

11. The image processing apparatus as claimed in claim 10, wherein said motion compensation unit is configured to generate said at least one preceding motion compensated image by compensating motion in the directly preceding output image converted from the input image directly preceding the present input image.

12. The image processing apparatus as claimed in claim 1, wherein said spatio-temporal detail signal generation unit comprises a low-pass filter configured to low-pass filter said input image and to subtract said low-pass filtered input image from said weighted selection image.

13. The image processing apparatus as claimed in claim 12, wherein said spatio-temporal detail signal generation unit further comprises
a local variance estimation unit configured to estimate the local variance of a filter kernel of said low-pass filter from said input image and
an adapted filter selection unit configured to select an optimal filter kernel of said low-pass filter based on said estimated local variance and a set of available filters.

14. The image processing apparatus as claimed in claim 1, further comprising a multiplication unit configured to multiply said detail signal with a predetermined gain factor,
wherein said combination unit is configured to generate said enhanced output image from said input image, said detail signal multiplied with said gain factor and said modelled image.

15. The image processing apparatus as claimed in claims 14,
further comprising a gain factor computation unit configured to generate said gain factor from said feature information.

16. The image processing apparatus as claimed in claim 15, wherein said gain factor computation unit is configured to generate said gain factor by multiplying said flat map, said noise map, 1 minus the edge gain map and a global predetermined gain value.

17. The image processing apparatus as claimed in claim 1, further comprising a summation unit configured to add said detail signal to said input image to generate a high detail image,
wherein said combination unit is configured to generate said enhanced output image by combining said high detail image and said modelled image.

18. The image processing apparatus as claimed in claim 1, wherein said motion compensation unit is configured to use at least one of motion vectors and motion compensation information previously acquired and/or stored in a motion compensation information storage.

19. The image processing apparatus as claimed in claim 1, wherein said motion compensation unit is configured to generate at least one of motion vectors and motion compensation information from said output images.

20. A display device comprising
an image enhancement apparatus as claimed in claim 1 for enhancing an input image of a sequence of input images and obtaining an enhanced output image and
a display for displaying said output image.

21. An image enhancement method for enhancing an input image of a sequence of input images and obtaining an enhanced output image, said method comprising:
generating, using a processor, at least one preceding motion compensated image by compensating motion in a preceding output image,
generating a weighted selection image from said input image and said preceding motion compensated image, both being weighted by a respective selection weighting factor,
analysing at least the input image and generating feature information by segmenting the input image into two or more input image regions having different features,
generating a modelled image by applying an image model, in particular a Huber Markov image model, on at least one of said input image and said weighted selection image,
generating a detail signal from said input image and said weighted selection image, and
generating said enhanced output image from said input image, said detail signal and said modelled image,
wherein said weighted selection image is generated by adding said input image after weighting it with a first selection weighting factor and said preceding motion compensated image after weighting it with a second selection weighting factor.

22. Computer readable non-transitory medium having instructions stored thereon which, when carried out on a computer, cause the computer to perform the steps of the method as claimed in claim 21.

23. An image enhancement apparatus for enhancing an input image of a sequence of input images and obtaining an enhanced output image, said apparatus comprising:
a motion compensation means for generating at least one preceding motion compensated image by compensating motion in a preceding output image,
a weighted selection means for generating a weighted selection image from said input image and said preceding motion compensated image, both being weighted by a respective selection weighting factor,
a feature analysis means configured for analysing at least the input image and generating feature information by segmenting the input image into two or more input image regions having different features,
an image model means for generating a modelled image by applying an image model, in particular a Huber Markov image model, on at least one of said input image and said weighted selection image,
a spatio-temporal detail signal generation means for generating a detail signal from said input image and said weighted selection image, and
a combination means for generating said enhanced output image from said input image, said detail signal and said modelled image,
wherein said weighted selection means is configured for generating said weighted selection image by adding said input image after weighting it with a first selection weighting factor and said preceding motion compensated image after weighting it with a second selection weighting factor.

* * * * *